E. T. McCORMICK & J. W. BASHAW.
Harvester.
No. 232,048.              Patented Sept. 7, 1880.
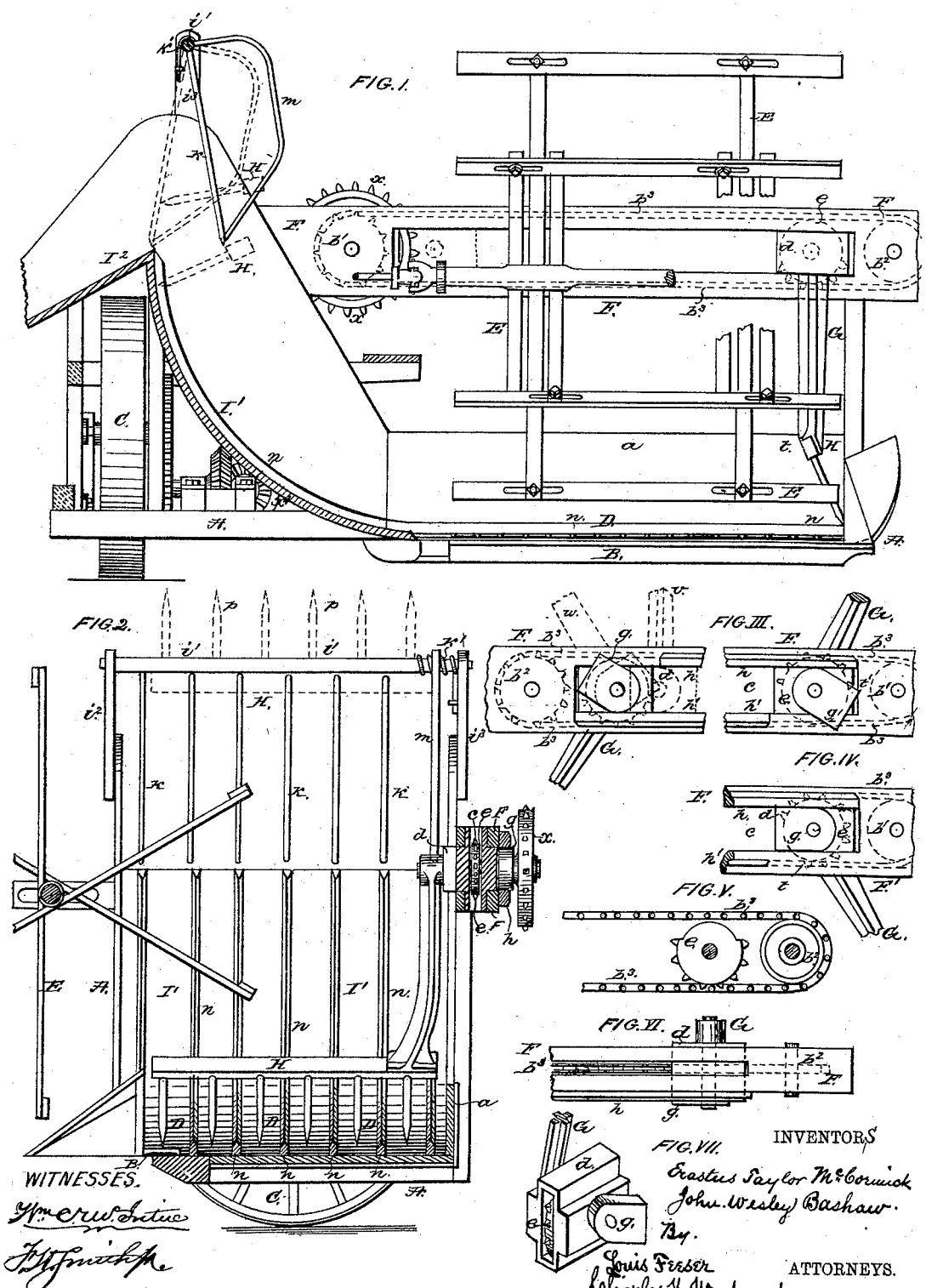

UNITED STATES PATENT OFFICE.

ERASTUS T. McCORMICK AND JOHN W. BASHAW, OF MINNEAPOLIS TOWNSHIP, HENNEPIN COUNTY, MINNESOTA.

HARVESTER.

SPECIFICATION forming part of Letters Patent No. 232,048, dated September 7, 1880.

Application filed February 12, 1880.

*To all whom it may concern:*

Be it known that we, ERASTUS TAYLOR MCCORMICK and JOHN WESLEY BASHAW, both of Minneapolis township, in the county of Hennepin and State of Minnesota, have made certain new and useful Improvements in Grain-Harvester Rakes, which improvements are fully set forth in the following specification and accompanying drawings, in which—

Figure I is a sectional front elevation. Fig. II is a sectional end view; Figs. III, IV, V, VI, and VII, detached detail views of the rake-operating mechanism.

This invention relates to grain-harvesters; and it consists in an arrangement of mechanism whereby the grain is removed from the grain-platform by a rake traveling above the straw entirely across the grain-table parallel with the cutter-bar, as hereinafter set forth.

A is the frame; B, the cutter-bar; C, the driving-wheel; D, the grain-table, and E, the reel, all arranged in any of the well-known styles, this invention being applicable to any kind of harvester.

F is a frame secured to the harvester above the rear grain-board, $a$, and provided at either end with chain-pulleys $b'$ $b^2$, and having a chain, $b^3$, running around them inside the frame F. In this frame is an open slot, $c$, in which a box, $d$, slides between the two sides of the chain, said box being hollow and having a third chain-pulley, $e$, with a portion of its teeth wanting, mounted therein and adapted to be operated by the same chain $b^3$.

The ends of the shaft of the pulley $e$ project beyond both sides of the box $d$, and are provided on the inner end with an arm, G, to which a rake, H, is attached, and on the outer end with a lug or block, $g$. This block is arranged to slide back and forth between two slides, $h$, or the edge of the slot $c$, the upper slide being shorter than the lower one on the left-hand end, while the lower one is shortest on the right-hand end; or the slides may be dispensed with and notches or cavities cut in the edge of the slot $c$, the object to be hereinafter explained.

I' is a curved table, being a continuation of the grain-platform D, up which the grain is carried by the rake to elevate it over the drive-wheel and convey it down the incline I² to the binders' table or into the self-binder, which will be arranged in the usual manner.

Above the upper end of the curved table a cross-bar, $i'$, is pivoted in two stationary uprights, $i^2$ and $i^3$, and provided with fingers or guards $k$ projecting downward therefrom, said guards being kept in the position shown in full lines in Fig. I by a spring, $k'$.

An inclined arm, $m$, is attached to the same cross-bar $i'$ and adapted to be acted upon by the rake-bar H to throw the fingers $k$ outward when the rake is brought around beneath them to cause the fingers to throw the grain from the rake down the incline I², as hereinafter explained.

Slats $n$ will be placed lengthwise of the grain-platform D and up the curved table I', to enable the rake-teeth to project down between them and beneath the straw to insure its entire removal from the table.

The chain-wheels $b'$ $b^2$ will be operated from the drive-wheel C by a chain or other device on the wheel $x$.

When the machine is put in operation the chain-wheels $b'$ $b^2$ will cause the chain $b^3$ to revolve, as before described.

The pulley $e$ is made with a portion of its teeth wanting, usually about one-third, ($\frac{1}{3}$,) and will have the block $g$ set at right angles to a line drawn through the center of this blank space, so that when the chain begins to move forward the block running between the slides will prevent the pulley from turning and hold the blank space opposite one side of the chain. This will cause the chain to catch the tooth opposite the center of the blank space and move the whole box $d$ and pulley $e$ in whichever direction the side of the chain opposite the blank space happens to be moving.

The forward movement of the box $d$ will continue until the end of the slot $c$ is reached, when the box will be stopped by striking against the end of the slot. At this point, as before described, one of the slides is cut away so as to form a recess, thereby removing the obstruction from the block $g$ and allowing it to revolve freely one-half a revolution, which the continued movement of the chain will do by its action upon the wheel $e$. This movement will continue until the opposite side of the block strikes the long side of the slide $h$, when the blank space on the pulley will have been brought opposite the other side of the chain from the one against which it had been running before, while the toothed side will be caught by the chain on the opposite side and the box $d$ drawn back again in the slot $c$, the block $g$ running between the slides, as before, to prevent the wheel $e$ from turning. The rake H, being secured to the shaft of the pulley $e$ by the arm G, will of course follow the motion of the pulley, and by that means move across the grain-platform D, carrying the grain with it, until the box $d$ strikes against the end of the slot $c$. The pulley, then being revolved one-half ($\frac{1}{2}$) a revolution, will cause the rake to follow the curve of the table I' and carry the grain up behind the fingers $k$, the sweep of the table I' being the segment of a circle of which the center of the pulley $e$, when at the forward end of the stroke of the box $d$, is the center. The rake, after passing the fingers, will continue its course until the block $g$ strikes the slide $h$, when it will be in the position shown at $p$ in Fig. II, in dotted lines.

When the rake-bar strikes the inclined arm $m$ on the finger-bar $i'$ it causes the fingers $k$ to push the grain off from the rake, as before described, and, continuing to revolve, the fingers are returned to their former position by the spring $k'$.

When the rake has been brought to the position shown at $p$, Fig. II, the block $g$ will have been thrown against the long end of the slide $h$, and will then begin its return movement. This will cause the rake H to travel in a line parallel with the grain-table D until the box $d$ strikes the opposite end of the slot $c$, when the block will be again free to revolve one-half ($\frac{1}{2}$) a revolution by reason of the shortness of the slide $h'$, which will cause the rake to move around and assume the position shown at $t$ in Fig. I, ready to again travel across the platform D. By this arrangement the rake travels across the platform D beneath the reel and backward above it, so as not to interfere with its action.

In Fig. III the rear side of the two opposite ends of the frame F is shown, the right-hand end showing the block $g$ and rake-arm G just after it has left the fingers $k$ and about to begin the return movement above the reel, the block being shown in the lower view, Fig. IV, as it will appear when the rake is just beginning its movement up the inclined or curved table I'.

When the point $t$ strikes the slide $h$ the blank space on the pulley $e$ will be uppermost, and thus the chain will cease to act upon that side, while, the block preventing the pulley revolving, the chain will draw the box $d$, rake H, and pulley $e$ along in a straight line.

The dotted lines at $v$, Fig. III, shows the position of the rake-bar G just before it reaches the end of its backward stroke, while the dotted lines at $w$ show the rake-bar just as it begins its semi-revolution in returning to the table D.

Fig. V shows the relative positions of the chains $b^3$ and pulley $e$. Fig. VI is a plan view of one end of the frame F, showing the arrangement of the box $d$, &c. Fig. VII is a perspective view of the box $d$, block $g$, pulley $e$, and rake-arm G removed from the frame F.

The speed with which the rake travels across the table D may be altered to suit the varying degrees of lightness or heaviness of the grain by altering the sizes of the chain-wheels $x$ $x'$, or in any other suitable manner. Of course, the heavier the grain the faster the rake will need to be run. By this arrangement we are able to dispense with the canvas or other conveyers or elevators and rake and elevate the grain by one operation and by one single rake in a very simple and effective manner, and without rattling or shaking the straw, which is a very important consideration in very ripe dry grain.

Having thus described our invention, what we claim as new, and desire to secure by Letters Patent, is—

1. The combination, with the platform D and curved table I', forming a continuation of said platform, of the rake H, swinging arm $m$, fingers $k$, and incline I², substantially as described, and for the purpose set forth.

2. The combination of the swinging fingers $k$, spring $k'$, inclined swinging arm $m$, and rake-bar H, all constructed and operating in the manner and for the purpose set forth.

3. The combination and arrangement of the chain-pulleys $b'$ $b^2$, chain $b^3$, party-toothed pulley $e$, slides $h$ $h'$, block $g$, and rake G H, whereby the rake is made to travel across the grain-table D in one direction in close proximity to it, and backward in the same vertical plane in a position not to interfere with the reel or other parts of the machine, substantially as set forth.

4. The combination and arrangement of the rake-bar H, rake-arm G, party-toothed pulley $e$, and block $g$, in the manner substantially as set forth.

5. The combination, with the block $g$, of slides $h$ $h'$, having recesses arranged and operating in the manner and for the purpose substantially as set forth.

6. The combination and arrangement of the chain-pulleys $b'$ $b^2$, chain $b^3$, and party-toothed pulley $e$, substantially as set forth.

In testimony whereof we have hereunto set our hands in the presence of two subscribing witnesses.

ERASTUS TAYLOR McCORMICK.
JOHN WESLEY BASHAW.

Witnesses:
C. N. WOODWARD,
LOUIS FEESER.